United States Patent [19]

Collins, Jr. et al.

[11] Patent Number: 5,084,645
[45] Date of Patent: Jan. 28, 1992

[54] ELECTROREPULSIVE ACTUATOR

[75] Inventors: Earl R. Collins, Jr.; Kenneth C. Curry, both of La Canada, Calif.

[73] Assignee: The United States of America as represented by the Administrator of the National Aeronautics and Space Administration, Washington, D.C.

[21] Appl. No.: 443,522

[22] Filed: Nov. 30, 1989

[51] Int. Cl.$^5$ ............................................. H02N 1/08
[52] U.S. Cl. .................................... 310/309; 310/308
[58] Field of Search .................... 310/309, 12, 13, 14, 310/308

[56] References Cited

U.S. PATENT DOCUMENTS

| 23,460 | 2/1952 | Felici | 310/309 |
|---|---|---|---|
| 667,144 | 1/1901 | Cook | 310/309 |
| 2,848,632 | 8/1958 | Keene | 310/80 |
| 2,915,654 | 12/1959 | Robinson | 310/14 |
| 3,219,853 | 5/1962 | Schreiber | 310/14 |
| 3,824,420 | 7/1974 | Stegeman et al. | 310/89 |
| 4,123,691 | 10/1978 | Seilly | 310/80 |
| 4,145,625 | 3/1979 | Seilly | 310/27 |
| 4,197,488 | 4/1980 | Kant | 318/115 |
| 4,215,283 | 7/1980 | Hinds | 310/14 |
| 4,278,904 | 7/1981 | Seilly | 310/12 |
| 4,562,373 | 12/1985 | Tokusima et al. | 310/12 |
| 4,642,882 | 2/1987 | Castiglione et al. | 310/12 |
| 4,712,027 | 12/1987 | Karidis | 310/14 |
| 4,736,127 | 4/1988 | Jacobsen | 310/309 |
| 4,760,302 | 7/1988 | Jacobsen | 310/309 |

FOREIGN PATENT DOCUMENTS 0136982  6/1988  Japan .................................... 310/309

OTHER PUBLICATIONS

Article, "Ames Invention Ices Top NASA Award", pp. 34 and 69, Jun. 1988, NASA Tech Briefs.

Primary Examiner—R. Skudy
Assistant Examiner—Judson H. Jones
Attorney, Agent, or Firm—Thomas H. Jones; John R. Manning

[57] ABSTRACT

The invention is a linear actuator that operates under the principle that like charges repel and opposite charges attract. The linear actuator consists of first and second pairs of spaced opposed conductors where one member of each pair of conductors is attached to a fixed member, and where the other member of each pair of conductors is attached to a movable member such as an elongated rod. The two pairs of spaced conductors may be provided in the form of two spacedly interwound helical vanes where the conductors are located on the opposite sides of the two helical vanes. One helical vane extends inwardly from a housing and the other helical vane extends outwardly from an elongated rod. The elongated rod may be caused to move linearly with respect to the housing by applying appropriate charges of like or opposite polarity to the electrical conductors on the helical vanes.

19 Claims, 3 Drawing Sheets

ELECTROREPULSIVE ACTUATOR

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates generally to mechanical devices that operate under the electroattractive or electrorepulsive forces that are created in the presence of electrical charges of opposite or like polarity. More specifically, the present invention relates to a linear actuator.

BACKGROUND ART

The present invention provides a novel actuating device. A "pin puller", used for the deployment and activation of satellite components, is a typical application for the subject invention. In such an application, the "pin puller" is used to unlatch the various panels, components, etc. that are to expand and deploy upon orbital placement of the satellite.

Certain characteristics are desired of any device used in a satellite type application, to wit: the device should be light in weight, the device should consume little energy, the device should not detrimentally effect the operation of any of the sensitive components located on the satellite, and the device should operate with near perfect dependability.

Although electromagnetic solenoids may be used as "pin pullers," such solenoids are undesirable because they are typically very heavy. In addition, the electromagnet's magnetically permeable core (typically iron) and windings (typically copper) are not only heavy but are also susceptible to rust or corrosion. Electromagnetic solenoids also consume large amount of energy and their erratic magnetic fields can detrimentally effect surrounding components.

Explosive type devices are typically used as an alternative to electromagnetic "pin pullers". However, because an explosive "pin puller" is a one-time-only device, the actual device to deployed with the satellite cannot be ground tested for reliability. Moreover, explosive "pin pullers" are usually a source of extreme mechanical shock loads.

SUMMARY OF THE INVENTION

It is therefore an object of the present invention to provide a linear actuator that is light in weight;

It is another object of the present invention to provide a linear actuator that does not require large amounts of energy;

It is another object of the present invention to provide a linear actuator that is relatively impervious to rust and corrosion;

It is another object of the present invention to provide a linear actuator that will not detrimentally effect surrounding electronic components during use; and It is another object of the present invention to provide a linear actuator that can be operated a plurality and can be ground tested for reliability.

Accordingly, as discussed in more detail further herein, a linear actuator based on the principle that opposite charges attract and like charges repel is provided in order to achieve all of the aforementioned objects.

More specifically, the present invention provides a linear actuator for imparting limited linear movement to an elongated rod contained within a housing comprising a first pair of spaced opposed conductors, one of the first conductors connected to the rod and the other connected to the housing; a second pair of spaced opposed conductors, one of the second conductors connected to the rod and the other connected to the housing; and means for applying electrical charges to the respective pairs of opposed conductors whereby linear motion may be imparted to the rod.

BRIEF DESCRIPTION OF THE DRAWINGS

The just-summarized invention will now be described in detail in conjunction with the drawings of which.

DETAILED DESCRIPTION OF THE INVENTION

The following description is provided to enable any person skilled in the art of electromotive actuators to make and use the invention and sets forth the best mode contemplated by the inventor for carrying out the invention. However, various modifications will remain readily apparent to those skilled in these arts, since the herein disclosure relates to the generic principles of providing a linear actuator that is both economical and practical.

Figure 1:
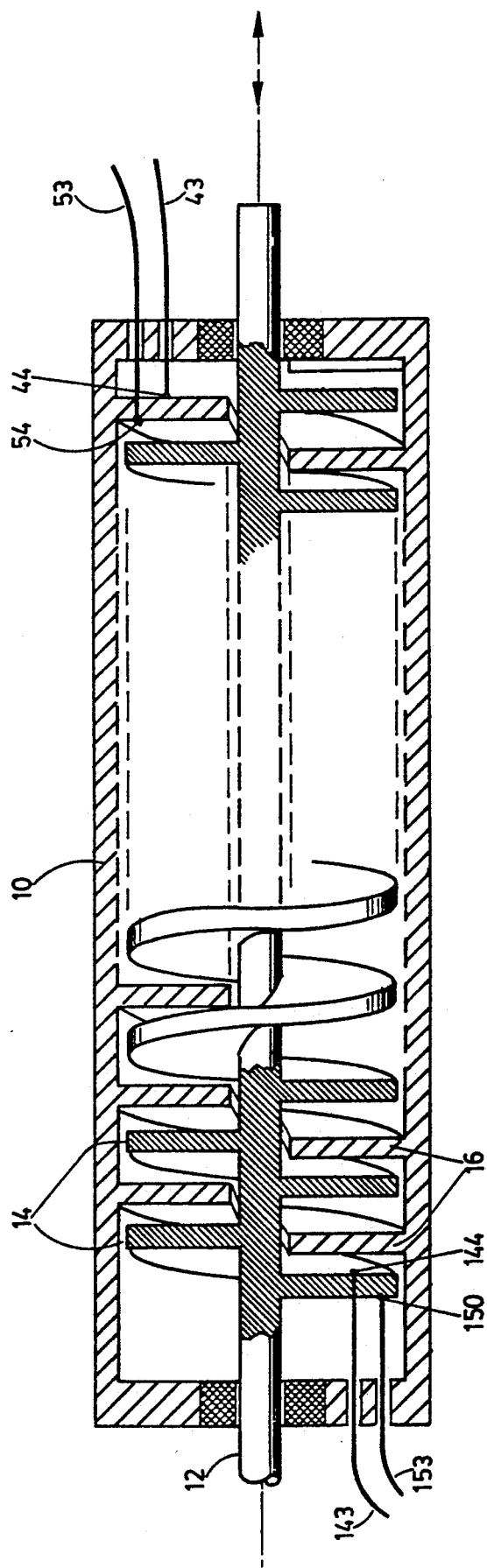
FIG. 1 is a partial cross-sectional view of the present invention.

FIG. 1 is a partial cross-sectional view of a preferred embodiment of a linear actuator according to the present invention. The linear actuator shown in FIG. 1 bears a strong resemblance to a lead screw in a loosely fitting nut. However, no rotary motion is involved as the device is intended to provide pure axial translation of an elongated rod 12.

The linear actuator depicted in FIG. 1 is comprised of a housing 10, which housing 10 has an inwardly extending helical vane 16 that spirals continuously from one end of the housing 10 to the other. Such a housing 10 would likely be constructed of plastic and could either be molded in a single operation or, alternatively, molded in two halves and then assembled to form a complete unit. The linear actuator is further comprised of an actuator rod 12, which actuator rod 12 has a helical vane 14 extending radially outward therefrom. Although the actuator rod 12 shown is round in cross section, it may have a square or splined shaft in order to prevent rotation.

The linear actuator is assembled by simply winding the helical vane 14 of actuator rod 12 into the helical vane 16 of the housing 10 much like a screw is wound into a nut. In this manner, the helical vane 14 is spacedly interwound with the helical vane 16 as shown in FIG. 1.

Figure 2:
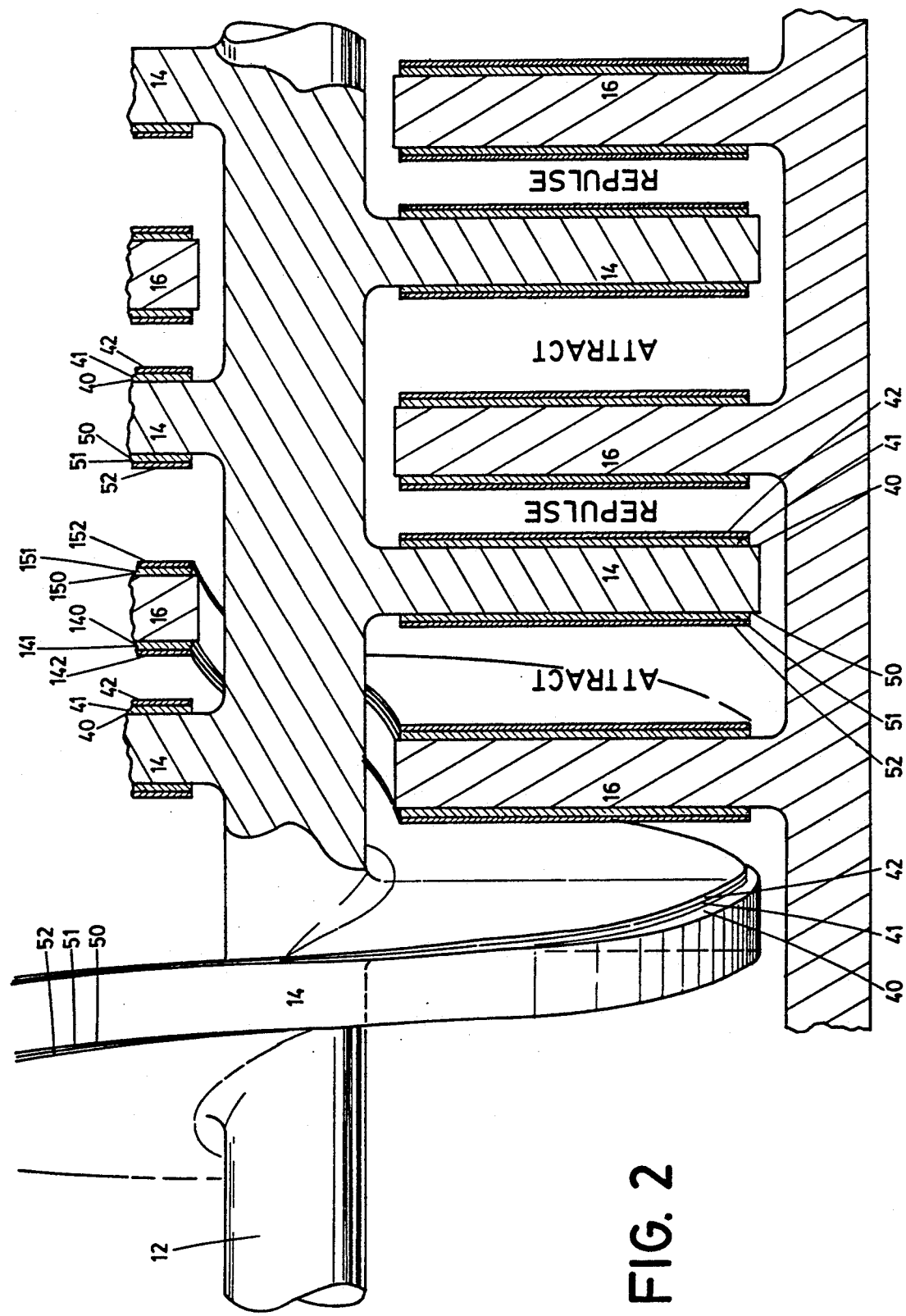
FIG. 2 is an enlarged cross-sectional view of a portion of FIG. 1.

In order to ensure proper operation, the pitch between the spirals of the helical vane 14 must be somewhat larger than the width of the helical vane 16, and vice verse, such that axial movement is possible within the gap formed therebetween. With reference to FIG. 2, note that the actuator rod 12 may undergo a maximum axial movement that is equal to the maximum gap between opposing surfaces 42 and 142 or 52 and 152 of the two helical vanes 14 and 16. The gap must be large enough to permit the full desired axial movement of the actuator rod 12, yet small enough to permit the forces of electrostatic repulsion and attraction to work. It is contemplated by the inventors a gap in the range of 0.05" to 0.25" would provide an actuator with sufficient movement and dependability for practical application.

FIG. 2 provides a more detailed cross-sectional view of the linear actuator of FIG. 1. As shown in FIG. 2, both helices 14, 16 are made from a rigid material such as plastic. Of course a conductive material having a noncondutive coating could be used with equally desirable results. Helix 14 has surfaces 140, 150 while helix 16 is comprised of surfaces 40, 50. Note that surface 40 opposes surface 140 and that surface 50 opposes surface 150. The helices 14, 16 are covered on all faces 40, 140, 51, 150 by a sandwich of a conductive film 41, 141, 50, 151 and by an insulating dielectric covering film 42, 142, 52, 152. It is contemplated that the conductive layers would be vapor deposited on opposite sides of the helices and then coated with the insulator material. The insulating covering prevents a short circuit from occurring if the helices 14, 16 come into contact with one another. The linear actuator of FIGS. 1 and 2 further comprises conducting means 43, 143, 53, 153 that are connected to the respective conductive films 41, 141, 51, 151 with connecting means 44, 144, 54, 154. Using the above construction, each of the conducting films 41, 141, 51, 151 of the helices can store a substantial electric charge that is provided thereto with conducting means 43, 143, 53, 153.

Operation of the linear actuator will now be described. Movable helical vane 14 may be caused to be repelled from the fixed helical vane 16 by applying charges to the conducting film 141 on face 140 of the helical vane 14 and by applying a charges of like polarity to the conductive film 41 on the face 40 of the helical vane 16. In a similar manner, the movable helical vane 14 may be attracted to the fixed helical vane 16 by applying charges to the conducting film 141 on face 140 of the helical vane 14 and by applying charges of opposite polarity to the conductive film 41 on the face 40 of the helical vane 16.

In a preferred embodiment, it is contemplated that the forces of repulsion and attraction would be combined in order to achieve a greater aggregate axial force. Thus, charges of like or opposite polarity, as desired, may also be applied to opposed conductive films 51, 151 in order to assist in the movement of actuator rod 12. For example, referring to FIG. 2, if there are charges of opposite polarity placed on the two facing conductive films 50 and 150, the charges will attract each other and the shaft will move to the left. Additional force may be created to aid this motion by applying charges of like polarity to conductive films 40 and 140. The general rule of operation is to place opposite charges across a gap which is to be reduced in length by axial motion and to place like charges across a gap which is to be increased in length. The combined effect of the above described charge placement is illustrated by the arrows in FIG. 2, which symbolically show a combination of charge accumulations that act in concert to move the shaft 12 and vane 14 to the left. The shaft 12 and vane 14 may be returned to the right by applying to the faces opposite polarity charges from those shown. Alternatively, a biasing means may be used to return the shaft 12 to its original position.

In an alternative embodiment (not shown), the helices 14, 16 may be replaced by flat circular surfaces that are wired together so as to provide a combined surface area for the storage of electrical charge to generate the requisite force.

The helical configuration shown in FIGS. 1 and 2 is considered to be the preferred embodiment of the present invention because such a configuration beneficially provides a relatively large charge accumulation area within a relatively small and compact housing 10. Of course, where additional electromotive force of range of movement necessary, the length and/or the diameter of the linear actuator may be extended in order to increase the available charge accumulation area.

Figure 3A:
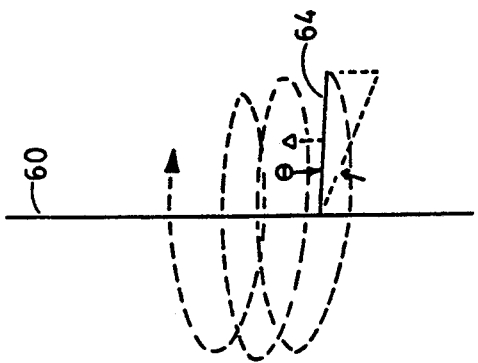
FIG. 3a is a diagram of a helical surface that is mapped out with a line that is perpendicular to an axis of rotation.
Figure 3B:
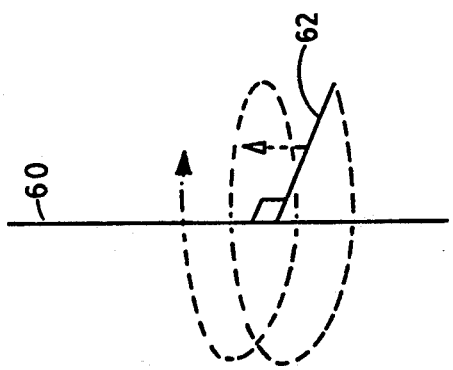
FIG. 3b is a diagram of a helical surface that is mapped out with a line that is not perpendicular to the axis of rotation.

Note that the linear actuator of FIGS. 1 and 2 is shown with spirals of the helices 14 and 16 protruding at a right angle with respect to the longitudinal axis of the actuator. Although the spirals may protrude at right angles without detriment, it may be desirable to slant the spirals from the perpendicular in order to increase the available surface area for charge accumulation within a given cylindrical housing. In this regard, refer to FIG. 3a which diagrammatically illustrates how a helical surface like that shown in FIGS. 1 and 2 would be mapped out by rotating a perpendicular line 62 about a longitudinal axis 60 while simultaneously moving line 60 upward in the direction shown. FIG. 3b diagrammatically illustrates the proposed alternative embodiment wherein the helical surface is formed by rotating and moving a line 64 about the axis 60 where the line 64 is offset from the perpendicular by an angle $\theta$. Note that based on the well-known principle that the hypotenuse of a triangle is longer than either of its other two sides and given the same cylindrical space, the surface area of the helix mapped out by the line 64 in FIG. 3b would be greater than the surface area of the helix mapped out by the perpendicular line 62 in FIG. 3a.

In addition to size and charge accumulation area considerations, the helical configuration is also considered to be the preferred embodiment because it beneficially provides the relatively large charge accumulation area without need for discrete electrical connections. Note that in an alternative configuration, such as a series of separate parallel interleaved plates (circular or otherwise), it would be necessary to make discrete electrical connections between the faces of the plates having a similar orientations in order to achieve a large charge accumulation area.

As will be apparent to those skilled in the art, various modifications and adaptations of the preferred embodiment may be made without departing from the scope and spirit of the invention. For instance, the present invention may be modified so that the shaft 12 is stationary while the housing 10 is caused to more. Alternatively, the shaft 12 and the housing 10 may alternatively be held and released to provide a ratcheted crawling motion in response to synchronized reversals of charge applications. Note that the present invention may also be used as a positioning device by employing a position feedback system in order to vary the magnitude or duty cycle of the applied voltages It is therefore to be understood that, within the scope of the appended claims, the invention may be practiced other than as specifically described herein.

What is claimed is:

1. A linear actuator for imparting limited linear movement to a movable member that is held movably adjacent to a fixed member comprising:

at least one fixed vane extending from said fixed member towards said movable member, said at least one fixed vane having first and second faces;

at least one movable vane extending from the movable member towards said fixed member, said at least one movable vane having first and second faces;

the first face of said at least one movable vane facing the first face of said at least one fixed vane;

the second face of said at least one movable vane facing the second face of said at least one fixed vane;

the movable member being movable in a first direction wherein the first faces move towards one another and movable in a second direction wherein the second faces move towards one another;

a first pair of spaced opposed conductors, one of the first conductors located on the first face of said at least one movable vane and the other of the first conductors located on the first face of said at least one fixed vane;

a second pair of spaced opposed conductors, one of the second conductors located on the second face of said at least one movable vane and the other of the second conductors located on the second face of said at least one fixed vane; and means for applying electrical charges to the respective pairs of opposed conductors whereby linear motion may be imparted to the movable member.

2. The linear actuator of claim 1 wherein the means for applying electrical charges comprises a means for applying opposite charges to the first pair of conductors whereby the attractive forces of the opposite charges cause the movable member to move in the first direction.

3. The linear actuator of claim 2 wherein the means for applying electrical charges further comprises a means for applying like charges to the second pair of conductors whereby the repulsive forces of the like charges, combined with the attractive forces of the opposite charges applied to the first pair of conductors, cause the movable member to move in the first direction.

4. The linear actuator of claim 1 wherein the means for applying electrical charges comprises a means for applying opposite charges to the second pair of conductors whereby the attractive forces of the opposite charges cause the movable member to move in the second direction.

5. The linear actuator of claim 4 wherein the means for applying electrical charges further comprises a means for applying like charges to the first pair of conductors whereby the repulsive forces of the like charges, combined with the attractive forces of the opposite charges applied to the first pair of conductors, cause the movable member to move in the second direction.

6. The linear actuator of claim 1 including a plurality of fixed vanes, a plurality of movable vanes, and additional pairs of spaced conductors such that the electromotive force may be increased.

7. The linear actuator of claim 6 wherein the plurality of fixed and movable vanes are comprised of a plurality of parallel interleaved plates.

8. The linear actuator of claim 1 wherein the fixed member is a housing and wherein the movable member is an elongated rod that is contained within the housing.

9. The linear actuator of claim 8 wherein:

said at least one fixed vane comprises a first continuous helical vane extending inward from an external wall of the housing; and said at least one movable vane comprises a second continuous helical vane extending outward from the rod, the first and second helical vanes being interwound with one another whereby the opposing faces of the first and second helical vanes spacedly oppose one another along their helical length;

the first and second pairs of spaced conductors being located on the opposing faces of the first and second helical vanes.

10. The linear actuator of claim 9 wherein the helical vanes are comprised of a rigid nonconductive material and wherein the first and second pairs of conductors are vapor deposited on the faces of the helical vanes.

11. The linear actuator of claim 10 further comprising an insulating layer located over the conductors such that the faces of the helical vanes may come into contact with one another without short circuiting.

12. A linear actuator comprising:

a housing including an external wall and a first helical vane extending inward from the external wall, the first helical vane having a first side and a second side with a first electrical conductor attached to the first side of the first helical vane; and a rotor including a shaft member and a second helical vane extending outward from the shaft member, the second helical vane having a first side and a second side with a first electrical conductor attached to the first side of the second helical vane;

the second helical vane being spacedly interwound with the first helical vane such that the first and second sides of the second helical vane respectively oppose the first side and second sides of the first helical vane whereby the rotor may be cause to move axially under electrical attractive or repulsive forces created by applying electrical charges to the first electrical conductors of the respective first and second helical vanes.

13. The linear actuator of claim 12 further comprising a second electrical conductor attached to the second side of the first helical vane and a second electrical conductor attached to the second side of the second helical vane, the respective second electrical conductors opposing one another when the second helical vane is spacedly interwound with the first helical vane.

14. The linear actuator of claim 12 wherein the housing is made of a nonconductive material.

15. The linear actuator of claim 1 wherein said fixed and movable vanes are comprised of a rigid nonconductive material and wherein the first and second pairs of conductors are vapor deposited on the faces of said fixed and movable vanes.

16. The linear actuator of claim 15 further comprising an insulating layer located over the conductors such that the faces of said fixed and movable vanes may come into contact with one another without short circuiting.

17. The linear actuator of claim 1 wherein each of said conductors is comprised of a conductive portion and an insulating dielectric film overlying said conductive portion.

18. A linear actuator for imparting limited linear movement to a movable member that is held movably adjacent to a fixed member comprising:
- a first pair of spaced opposed conductors, one of the first conductors connected to the movable member and the other connected to the fixed member;
- a second pair of spaced opposed conductors, one of the second conductors connected to the movable member and the other connected to the fixed member;
- said fixed and movable members being comprised of a rigid nonconductive material and said first and second pairs of conductors being vapor deposited on the fixed and movable members;
- means for applying electrical charges to the respective pairs of opposed conductors whereby linear motion may be imparted to the movable member; and
- an insulating layer located over the conductors such that the fixed and movable members may come into contact with one another without short circuiting.

19. The linear actuator of claim 7 wherein the parallel interleaved plates are comprised of circular discs.

* * * * *